United States Patent [19]

Nutt

[11] Patent Number: 4,599,257
[45] Date of Patent: Jul. 8, 1986

[54] METHOD OF FORMING A METAL FIBERGLASS INTERFACE

[75] Inventor: Charles O. Nutt, Niles, Mich.

[73] Assignee: Thomas Wozniak, South Bend, Ind.

[21] Appl. No.: 586,623

[22] Filed: Mar. 6, 1984

[51] Int. Cl.⁴ ............................................. B32B 31/02
[52] U.S. Cl. ................................... 428/131; 156/196;
156/242; 156/245; 156/252; 156/253; 29/469.5;
29/521; 428/137; 428/174
[58] Field of Search .............. 156/196, 242, 245, 252,
156/253; 29/469.5, 521; 428/131, 137, 174

[56] References Cited

U.S. PATENT DOCUMENTS

| | | | |
|---|---|---|---|
| 2,054,210 | 9/1936 | Weisenburg | 156/252 |
| 2,059,576 | 11/1936 | Glick | 156/252 |
| 2,074,108 | 3/1955 | Downing | 156/253 |
| 2,650,185 | 8/1953 | Larson et al. | 156/252 |
| 2,966,436 | 12/1960 | Fox et al. | 156/253 |
| 3,850,725 | 11/1974 | Spielau et al. | 156/291 |
| 3,862,490 | 1/1975 | Tsuneishi et al. | 29/521 |
| 4,366,656 | 1/1983 | Simpson | 52/395 |
| 4,398,984 | 8/1983 | Uchiyama et al. | 156/196 |

*Primary Examiner*—Caleb Weston
*Attorney, Agent, or Firm*—Henderson & Sturm

[57] ABSTRACT

A method of creating a waterproof metal/fiberglass interface for a composite structural component, comprising the steps of: bending one end (13) of an apertured metal sheet into a U-shaped channel (24); filling the channel (24) with a resin impregnated fabric (23); and then laying a gel coat adjacent the metal, a calking bead at the juncture of the metal and gel coat, and an overcoat of fiberglass that will penetrate the apertures (14) in the metal and the fabric (23).

8 Claims, 5 Drawing Figures

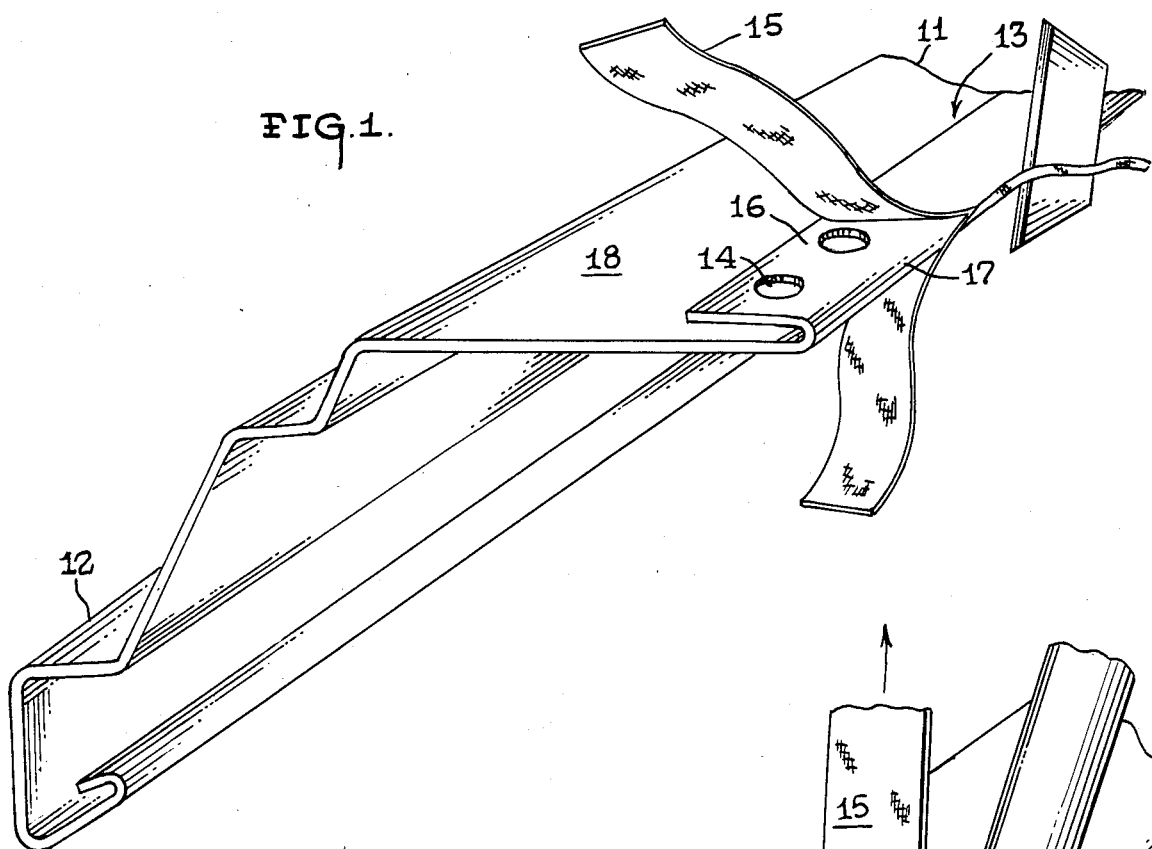
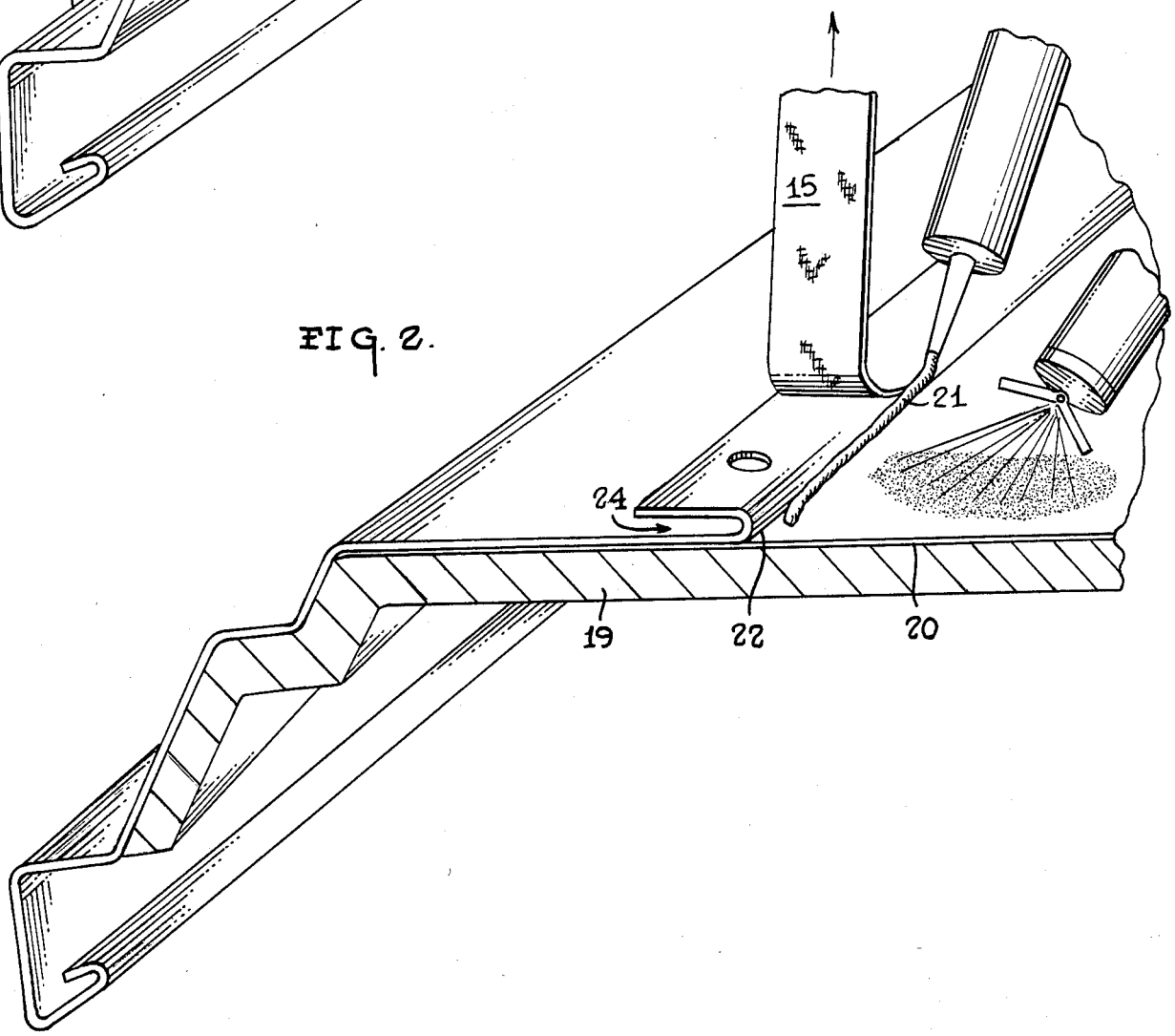

METHOD OF FORMING A METAL FIBERGLASS INTERFACE

TECHNICAL FIELD

This invention relates generally to methods employed to join disparate material together with the resultant seam having an aesthetically pleasing appearance.

BACKGROUND ART

One of the oldest problems confronting the manufacturing industry has been how to develop methods of joining generally incompatible disparate materials into composite structures.

While methods have been developed for joining various disparate material together, the resultant bonds have generally proved less than desirable for a number of reasons.

While compatible material can be joined together in a strong, aesthetically pleasing manner, the materials that are considered incompatible produce entirely different results.

When a bond is formed between materials that are considered incompatible, the bond is usually bulky, structurally weak, and aesthetically unappealing. One of the main reasons for these results is the fact that an intermediate material, that is compatible to both of the incompatible materials must normally be used to create the structural connection between the elements.

To that end, super adhesives have been developed that join together many materials heretofore considered incompatible. Unfortunately these super adhesives are very difficult to work with, and control in a manufacturing process; and have therefore not met with widespread acceptance or use.

In addition many other methods have been developed that, while they are capable of joining the disparate material together, produce an unsightly seam interface, that must be cosmetically improved or obscured for aesthetic reasons.

Some examples of the prior art solutions to the aforementioned problems may be seen by reference to U.S. Pat. Nos. 3,962,015; 3,821,052; 2,650,185; 4,366,656 and 3,850,725.

The specific materials, that the present invention is concerned with, are metal and fiberglass; wherein the term "fiberglass" for the remainder of the specification is understood to mean a mixture of glass fibers and a hardenable liquid resin. These materials both enjoy widespread use in the manufacturing industry; however, due to the problems enumerated supra, they are normally not combined together as an integral external component of finished products.

In virtually every known instance that metal and fiberglass are joined together on an exterior surface, the connection is accomplished by purely mechanical means. In those other instances where the metal/fiberglass interface is not visible, either mechanical or chemical (specifically super adhesives) connections are employed.

Despite the failures of the aforementioned prior art methods, the present invention has been found to produce a structurally sound, virtually waterproof bond between metal and fiberglass, that also provides an aesthetically pleasing external interface between these materials.

By using the method taught by this invention, composite structures of metal and fiberglass can now be manufactured for exterior surface components used in the appliance, construction, and automotive industry or the like.

DISCLOSURE OF THE INVENTION

The present invention has for its broad purpose the creation of a structurally sound bond between metal and fiberglass; and for its specific purpose, the creation of a virtually waterproof aesthetically pleasing external interface between the metal and fiberglass.

In order to accomplish the stated objectives of this invention, it was necessary to combine the physical characteristics and properties of these disparate materials in such a manner, that they would enhance the like properties that they share.

Briefly stated, this method involves the puncturing and distortion of the metal proximate the proposed metal/fiberglass interface. The distressed portion of the metal is then employed as an anchor element for the fiberglass, wherein the fiberglass is layed down on the metal and bleeds through the puncture holes, to form an integral bond with the metal when it cured.

The resultant bond is not only very strong due to the melding and interweaving of the materials; but also provides a very intimate, clean, exterior seam for the metal/fiberglass interface, that is particularly attractive for the external appearance of finished products.

While this method has heretofore been described broadly with respect to the exterior surface of finished products in general; it was in fact specifically developed to produce a watertight seam for standing seam roof panel assemblies, wherein the roof panel assembly is comprised a new composite metal/fiberglass construction.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIGS. 1 thru 3 illustrate the progressive steps employed in the method of the instant invention;

BEST MODE FOR CARRYING OUT THE INVENTION

Figure 3:
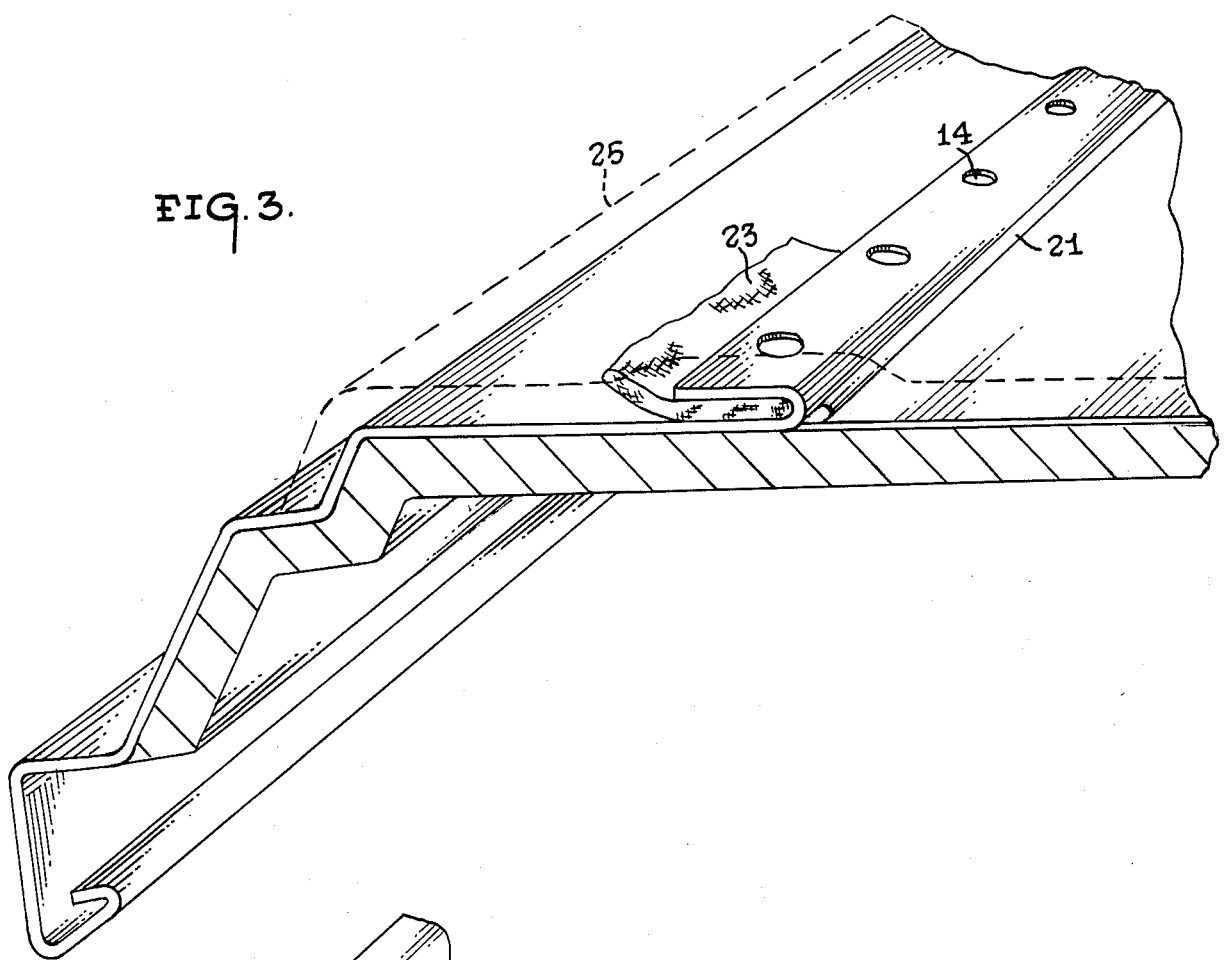
Figure 4:
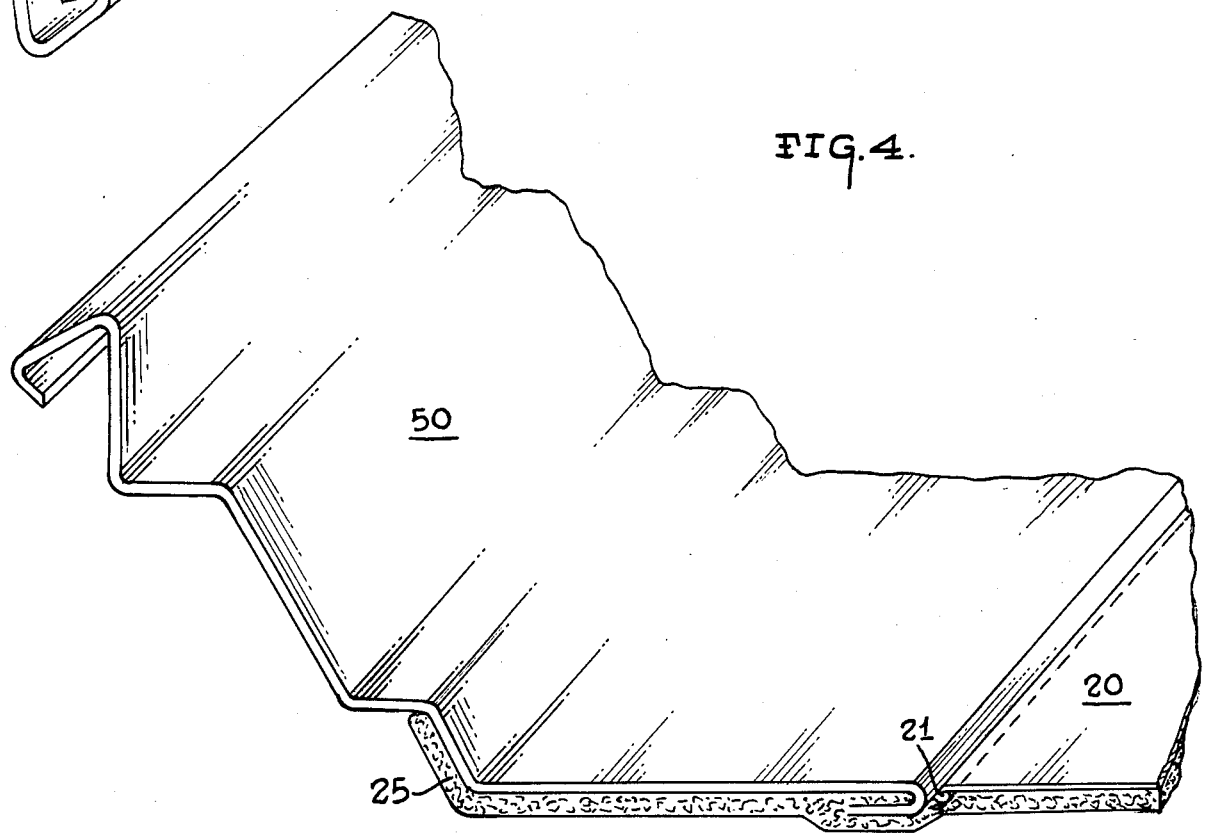
FIG. 4 is a detail view of the metal/fiberglass seam produced by the method of this invention.
Figure 5:
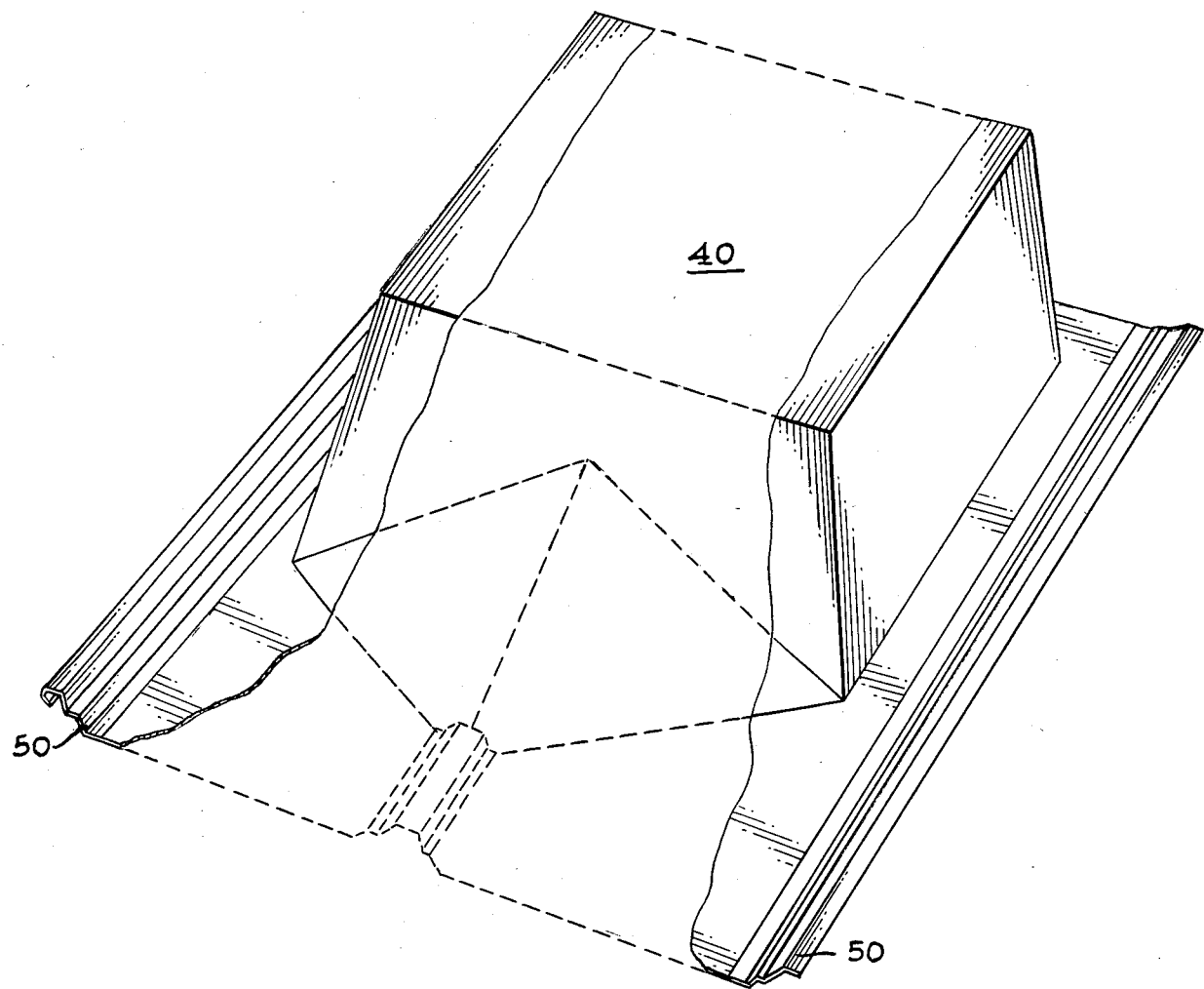
FIG. 5 is an enlarged perspective view of the finished roof panel assembly, that this method was specifically developed to produce.

As may be seen by reference to FIGS. 1 thru 3 the process of the instant invention comprises a plurality of steps that will now be described in seriatim fashion.

The first step in the process of fabricating a composite structure such as the roof panel assembly designated generally as (10) requires that a flat sheet of metal (11) be deformed so that one end (12) is configured as a standing seam portion, that can be joined in a well recognized fashion to complementary structure on a similarly fabricated panel assembly. The other end (13) of the flat sheet of metal is then punched, drilled or otherwise penetrated, to create a plurality of evenly spaced apertures (14) along the edge of the end (13). This end (13) of the metal sheet is then bent back upon itself in a generally U-shaped configuration so that the apertures

(14) are generally centrally disposed on the bent portion of metal sheet.

The structural component illustrated in FIG. 1 represents a sheet of metal that has been distressed, deformed, and worked to the point herein described in the specification. This component is then masked with tape (15), that will cover only the apertured leg (16) of the U-shaped bend. This step leaves the intermediate bend (17) and the unworked flat portion (18) of the metal exposed.

The metal component is then placed on a suitably configured support surface (19), with the apertured portion (16) of the metal sheet disposed on top. As shown in FIG. 2, the top of the support surface (19) is flat; however, it should be noted that a planar surface is only required in the vicinity of the proposed metal/fiberglass interface, as will be explained further on in the specification.

The next step in the process entails the laying down of a gel coat (20), on the support surface (19), and in intimate contact with the bend (17) in the metal sheet (11). Subsequent to the laying of the gel coat (20), a bead of calk (21) is deposited on the interior junction (22) of the gel coat and the metal sheet. Since the finished product is intended to be waterproof, and given the fact that metal and fiberglass have different expansion rates, the particular type of calk (21) chosen for this invention should be of the poly seam sealant variety, which does not totally cure or solidify. An example of such a sealant is a product of the same name (i.e. POLY SEAM SEALANT) sold by the Darworth Co. of Avon, Conn.

The final steps of this process are illustrated in FIG. 3, and comprise next to the last step of inserting a strip of resin impregnated fabric (23) into the channel (24) formed by the U-shaped bend. The strip of fabric (23) is dimensioned to fill the channel (24), and extend beyond the apertured leg (16) of the metal sheet to facilitate insertion. The last step of the process involves laying down the mixture of glass fibers and uncured liquid resin that forms the layer of fiberglass (25) over the gel coat (20) and a substantial portion of the metal sheet adjacent the apertured leg (16). The fiberglass (25) will migrate through the plurality of apertures (14) and penetrate into the fabric (23). When the resin component of the fiberglass cures the fiberglass (25) and fabric (23) will be virtually a one piece rigid element, that surrounds and extends through the apertured leg (16) of the metal sheet. In addition, the metal/fiberglass interface that was resting on the support surface will have a clean, crisp, seam or delineation between the disparate materials.

As mentioned supra, the calking bead (21) comprises an uncurable sealant material, and this bead (21) will provide a barrier for water attempting to fill any spaces created between the metal and fiberglass due to their different expansion rates.

Having described the steps of the preferred method of this invention, it should again be noted that this process was specifically developed to produce an improved metal/fiberglass composite construction for standing seam roof panel assemblies. The finished product produced by this process is illustrated in Fig. (5) and comprises a molded fiberglass body (40) joined on its periphery to a metal standing seam element (50) by the process heretofore described.

Obviously, many substitutions, modifications and variations of the invention are possible in light of the above teachings. It is therefore to be understood that, within the scope of the appended claims, the invention may be practiced otherwise than as specifically described.

What I claim is:

1. A method for forming a metal/fiberglass interface between a sheet of metal and a layer of fiberglass comprising the steps of:
    a) providing a plurality of spaced apertures along one edge of the sheet of metal to form an apertured portion;
    b) bending the apertured portion of the sheet of metal to form a U-shaped channel;
    c) placing the sheet of metal on a mold surface;
    d) masking the apertured portion of the U-shaped channel;
    e) applying a gel coat to the mold surface, wherein the gel coat contacts the exterior bend of the U-shaped channel;
    f) removing the masking from the apertured portion of the U-shaped channel; and
    g) applying a layer of fiberglass over the gel coat and the apertured portion of the sheet metal, wherein the layer of fiberglass covers a substantial portion of the metal sheet, and flows through the apertures to fill the U-shaped channel.

2. A method as in claim 1 comprising an intermediate step (h) between steps (f) and (g) wherein step h) involves depositing a bead of incurable calk at the juncture of the gel coat and the exterior bend of the U-shaped channel member.

3. A finished product produced by the method of claim 1.

4. The method of claim 1; wherein the metal sheet comprises a standing seam for a roof panel assembly.

5. A method for forming a metal/fiberglass interface between a sheet of metal and a layer of fiberglass comprising the steps of:
    (a) providing a plurality of spaced apertures along one edge of the sheet of metal to form an apertured portion;
    (b) bending the apertured portion of the sheet of metal to form a U-shaped channel, wherein the apertured portion of the sheet of metal forms one of the legs of the U-shaped channel;
    (c) placing the sheet of metal on a mold surface;
    (d) masking the apertured leg of the U-shaped channel;
    (e) applying a gel coat to the mold surface, wherein the gel coat contacts the exterior bend of the U-shaped channel;
    (f) depositing a bead of uncurable calk at the juncture of the gel coat and the exterior bend of the U-shaped channel member;
    (g) removing the masking from the apertured leg of the U-shaped channel;
    (h) inserting a resin impregnated strip of fabric into the channel, in order to fill the channel with fabric; and
    (i) applying a layer of fiberglass over the gel coat and the apertured portion of the sheet metal, wherein the layer of fiberglass covers a substantial portion of the metal sheet and penetrates the resin impregnated fabric that fills the U-shaped channel.

6. A method as in claim 5 wherein steps f) thru h) are interchangeable.

7. A finished product produced by the method of claim 5.

8. The method of claim 5; wherein the metal sheet comprises a standing seam for a roof panel assembly.

* * * * *